US012023819B2

(12) United States Patent
DeBaker

(10) Patent No.: US 12,023,819 B2
(45) **Date of Patent: *Jul. 2, 2024**

(54) KNIFE

(71) Applicant: Milwaukee Electric Tool Corporation, Brookfield, WI (US)

(72) Inventor: Joseph M. DeBaker, Greenfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,264

(22) Filed: Jan. 6, 2023

(65) Prior Publication Data

US 2023/0146556 A1 May 11, 2023

Related U.S. Application Data

(63) Continuation of application No. 17/367,865, filed on Jul. 6, 2021, now Pat. No. 11,548,174, which is a
(Continued)

(51) Int. Cl.
*B26B 1/04* (2006.01)
*B25G 3/32* (2006.01)

(52) U.S. Cl.
CPC .................................... *B26B 1/044* (2013.01)

(58) Field of Classification Search
CPC ........... B26B 13/28; B26B 1/046; B26B 1/04; B26B 1/048; B26B 13/10; B26B 1/044;
(Continued)

(56) References Cited

U.S. PATENT DOCUMENTS

| | | |
|---|---|---|
| 551,052 A | 12/1895 | Shonnard et al. |
| 672,050 A | 4/1901 | Williamson |

(Continued)

FOREIGN PATENT DOCUMENTS

| | | |
|---|---|---|
| CN | 201872174 U | 6/2011 |
| WO | WO2015175465 A1 | 11/2015 |

OTHER PUBLICATIONS

Letter from Jeffrey B. Haendler to Attorney for Applicant, Derek Campbell, regarding alleged prior art references, dated Mar. 16, 2021, 6 pages.

(Continued)

*Primary Examiner* — Ghassem Alie
(74) *Attorney, Agent, or Firm* — Reinhart Boerner Van Deuren s.c.

(57) ABSTRACT

A folding knife including a handle, a pivot axis, and a blade having a cutting edge. The blade is pivotably coupled to the handle such that the blade is pivotable relative to the handle about the pivot axis between a retracted position and an extended position. The cutting edge is exposed in the extended position and a portion of the blade is received within the handle in the retracted position. The folding knife further includes a bearing assembly for facilitating movement of the blade between the retracted position and the extended position. The bearing assembly includes a first bearing recessed within the blade and a second bearing recessed within the handle.

20 Claims, 5 Drawing Sheets

Related U.S. Application Data continuation of application No. 15/373,071, filed on Dec. 8, 2016, now Pat. No. 11,052,549.

(60) Provisional application No. 62/265,487, filed on Dec. 10, 2015.

(58) Field of Classification Search
CPC ... B26B 1/10; B26B 1/06; F16V 19/10; F16C 33/427; F16C 33/6614; F16C 11/045; B25G 3/38; Y10T 29/4984; Y10T 403/3219; Y10T 403/32951
USPC .............................. 30/160, 161; 403/91, 161
See application file for complete search history.

(56) References Cited

U.S. PATENT DOCUMENTS 1,465,700 A 8/1923 Weibul
1,538,564 A 5/1925 Leon
1,743,022 A 1/1930 Carman
1,996,501 A 4/1935 Baer
2,032,281 A 2/1936 Haywood
2,072,515 A 3/1937 Delaval-Crow
2,685,735 A 8/1954 Sorensen
3,170,237 A 2/1965 Weidauer
3,977,077 A 8/1976 Rebold
4,274,200 A 6/1981 Coder
4,451,982 A 6/1984 Collins
4,535,539 A 8/1985 Friedman et al.
4,612,706 A 9/1986 Yunes
4,730,394 A 3/1988 Sonner, Jr.
4,822,183 A 4/1989 Lederman
5,095,624 A 3/1992 Ennis
5,096,995 A 3/1992 Fukumoto et al.
5,111,581 A 5/1992 Collins
5,263,779 A 11/1993 Sakaguchi et al.
5,515,610 A 5/1996 Levin et al.
5,596,808 A 1/1997 Lake et al.
5,628,116 A 5/1997 Kohno
5,699,615 A 12/1997 Chen
5,737,841 A 4/1998 McHenry et al.
5,802,722 A 9/1998 Maxey et al.
5,815,927 A 10/1998 Collins
5,896,665 A 4/1999 Harris
D422,479 S 4/2000 Pardue
D422,871 S 4/2000 Terzuola
6,145,202 A 11/2000 Onion
6,154,965 A 12/2000 Sakai
D438,443 S 3/2001 Keating
6,308,420 B1 10/2001 Moser
6,338,431 B1 1/2002 Onion
6,354,007 B1 3/2002 Scarla
6,360,443 B1 3/2002 Remus
6,378,214 B1 4/2002 Onion
6,397,476 B1 6/2002 Onion
6,397,477 B1 6/2002 Collins
6,427,334 B2 8/2002 Onion
6,438,848 B1 8/2002 McHenry et al.
6,490,797 B1 12/2002 Lake et al.
6,523,265 B2 2/2003 Eickhorn
D473,917 S 4/2003 Carter, III
D474,669 S 5/2003 Onion
6,591,504 B2 7/2003 Onion
6,594,906 B1 7/2003 Sakai et al.
6,516,525 B2 12/2003 Liu
6,688,003 B2 2/2004 Scarla
6,915,577 B2 7/2005 Scala
6,941,661 B2 9/2005 Frazer
6,959,494 B2 11/2005 Taylor
7,051,441 B2 5/2006 Carter, III
7,059,053 B2 6/2006 Sakai
7,080,457 B2 7/2006 Sullivan
7,086,157 B2 8/2006 Vallotton
7,107,686 B2 9/2006 Linn et al.
7,124,509 B1 10/2006 Hawk
7,140,110 B2 11/2006 Lake
7,240,838 B2 7/2007 Bui et al.
7,249,417 B2 7/2007 Chu
7,305,768 B2 12/2007 Hinderer
7,305,769 B2 12/2007 McHenry et al.
7,313,866 B2 1/2008 Linn et al.
D560,996 S 2/2008 Onion
7,340,838 B2 3/2008 Onion
7,347,128 B2 * 3/2008 Rivera ................ B25B 23/0035 7/128
7,370,421 B2 5/2008 Onion et al.
D570,180 S 6/2008 Onion et al.
7,395,599 B2 7/2008 Onion
D579,299 S 10/2008 Ping
7,437,822 B2 10/2008 Flagg et al.
7,458,159 B2 12/2008 Galyean et al.
7,506,446 B2 3/2009 Onion
7,513,044 B2 4/2009 Lake
7,533,466 B2 5/2009 Steigerwalt
7,543,386 B2 6/2009 Sullivan
7,555,839 B2 7/2009 Koelewyn
7,562,455 B2 7/2009 McHenry et al.
7,581,321 B2 9/2009 Kain
7,676,931 B2 3/2010 Knight et al.
7,676,932 B2 3/2010 Grice
7,681,316 B2 3/2010 Hawk et al.
7,748,122 B2 7/2010 Duey
7,827,697 B2 11/2010 Lake
7,854,067 B2 12/2010 Lake
7,886,444 B2 2/2011 Kao
7,905,022 B2 3/2011 Hawk et al.
7,905,023 B2 3/2011 Westerfield
7,979,990 B2 7/2011 Hawk et al.
8,001,693 B2 8/2011 Onion
RE42,906 E 11/2011 Onion
D653,520 S 2/2012 Chang
8,261,633 B2 9/2012 Maxey
8,291,597 B2 10/2012 Hawk
8,307,555 B2 11/2012 Onion
8,359,753 B1 1/2013 Frazer
8,375,589 B2 2/2013 Bremer et al.
8,375,590 B2 2/2013 Duey
D677,551 S 3/2013 Pelton
8,412,228 B2 4/2013 Yoon
8,413,338 B2 4/2013 Freeman
8,511,208 B1 8/2013 Frazer
8,528,215 B2 9/2013 Elsener
D703,510 S 4/2014 Hyma
8,813,368 B2 8/2014 VanHoy
8,893,389 B2 11/2014 Freeman
8,939,053 B2 1/2015 Pardue
8,939,054 B2 1/2015 Hawk et al.
8,966,768 B2 3/2015 Onion
8,966,769 B1 3/2015 Mollick et al.
D754,515 S 4/2016 Harsey
D769,692 S 10/2016 Squiers et al.
10,371,134 B2 8/2019 Tsuboi et al.
2004/0134075 A1 7/2004 Chu
2005/0055833 A1 3/2005 Scarla
2005/0194238 A1 9/2005 Frazer
2006/0021230 A1 2/2006 Mikami
2006/0168822 A1 8/2006 Kaye
2006/0248728 A1 11/2006 Gibbs
2007/0234574 A1 10/2007 Constantine et al.
2010/0212163 A1 8/2010 Liu
2012/0047746 A1 * 3/2012 Caswell .................... B26B 1/02 30/161
2012/0180321 A1 7/2012 MacNair et al.
2012/0234142 A1 9/2012 Onion
2012/0304470 A1 * 12/2012 Freeman ................. B26B 1/046 30/159
2013/0047439 A1 2/2013 Hawk et al.
2013/0160300 A1 6/2013 Liu
2013/0318798 A1 12/2013 Elsener
2014/0115900 A1 5/2014 Ikoma
2014/0196218 A1 7/2014 Frazer
2014/0208595 A1 7/2014 Frazer
2014/0259687 A1 9/2014 Griffey
2015/0352731 A1 12/2015 France

(56) References Cited

U.S. PATENT DOCUMENTS

| | | | | |
|---|---|---|---|---|
| 2016/0368155 | A1 | 12/2016 | Mandeville et al. | |
| 2017/0066144 | A1 | 3/2017 | Michael | |
| 2017/0144316 | A1 | 5/2017 | Trull | |
| 2018/0169875 | A1 * | 6/2018 | Valdez | B25G 3/32 |
| 2020/0001476 | A1 | 1/2020 | Allen et al. | |

OTHER PUBLICATIONS

Letter from James D. Borchardt to Jeffrey B. Haendler, regarding the letter identified in A1, dated Mar. 24, 2021, 1 page.
Randy Johnson, "Bearing Maintenance on the ZT 450 . . . Deeper review?," YouTube, Aug. 14, 2015, https://www.youtube.com/watch?v=wB-8Vrn6APs.
CRKT Official, "How to Clean IKBS," YouTube, Nov. 26, 2014, https://www.youtube.com/watch?v=wR6-Is6QOUQ.
Letter from Alexa M. Johnson to Attorney for Applicant, Derek Campbell, on behalf of Columbia River Knife & Tool Co., regarding prior art references, dated Feb. 20, 2019, 4 pages.

* cited by examiner

KNIFE

CROSS-REFERENCE TO RELATED APPLICATIONS

This application is a continuation of U.S. application Ser. No. 17/367,865, filed Jul. 6, 2021, which is a continuation of U.S. application Ser. No. 15/373,071, now U.S. Pat. No. 11,052,549, filed Dec. 8, 2016, which claims the benefit of and priority to U.S. Provisional Patent Application No. 62/265,487, filed Dec. 10, 2015, the entire contents of each of which are incorporated by reference.

BACKGROUND

The present invention relates to knives and more particularly to folding knives.

SUMMARY

In one embodiment, the invention provides a folding knife including a handle, a pivot axis, and a blade having a cutting edge. The blade is pivotably coupled to the handle such that the blade is pivotable relative to the handle about the pivot axis between a retracted position and an extended position. The cutting edge is exposed in the extended position and a portion of the blade is received within the handle in the retracted position. The folding knife further includes a bearing assembly for facilitating movement of the blade between the retracted position and the extended position. The bearing assembly includes a first bearing recessed within the blade and a second bearing recessed within the handle.

In another embodiment, the invention provides a folding knife including a first handle portion, a second handle portion coupled to the first handle portion, a pivot axis, and a blade having a cutting edge. The blade is pivotably coupled to the handle between the first handle portion and the second handle portion. The blade is pivotable about the pivot axis between a retracted position and an extended position. The cutting edge is exposed in the extended position and a portion of the blade is received within the handle in the retracted position. The folding knife further includes a bearing coupled to the second handle portion for facilitating movement of the blade between the retracted position and the extended position. The bearing includes a bearing cage and a plurality of balls partially supported by the bearing cage. The blade and the second handle portion act as a bearing race to partially support the plurality of balls of the bearing.

In another embodiment, the invention provides a folding knife including a first handle portion, a second handle portion coupled to the first handle portion, a pivot axis, and a blade having a cutting edge. The blade is pivotably coupled to the handle between the first handle portion and the second handle portion. The blade is pivotable about the pivot axis between a retracted position and an extended position. The cutting edge is exposed in the extended position and a portion of the blade is received within the handle in the retracted position. The folding knife further includes a bearing coupled to the blade for facilitating movement of the blade between the retracted position and the extended position. The bearing includes a bearing cage that is recessed within the blade. The bearing further includes a plurality of balls that extend beyond the blade to form a gap between the blade and the first handle portion.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
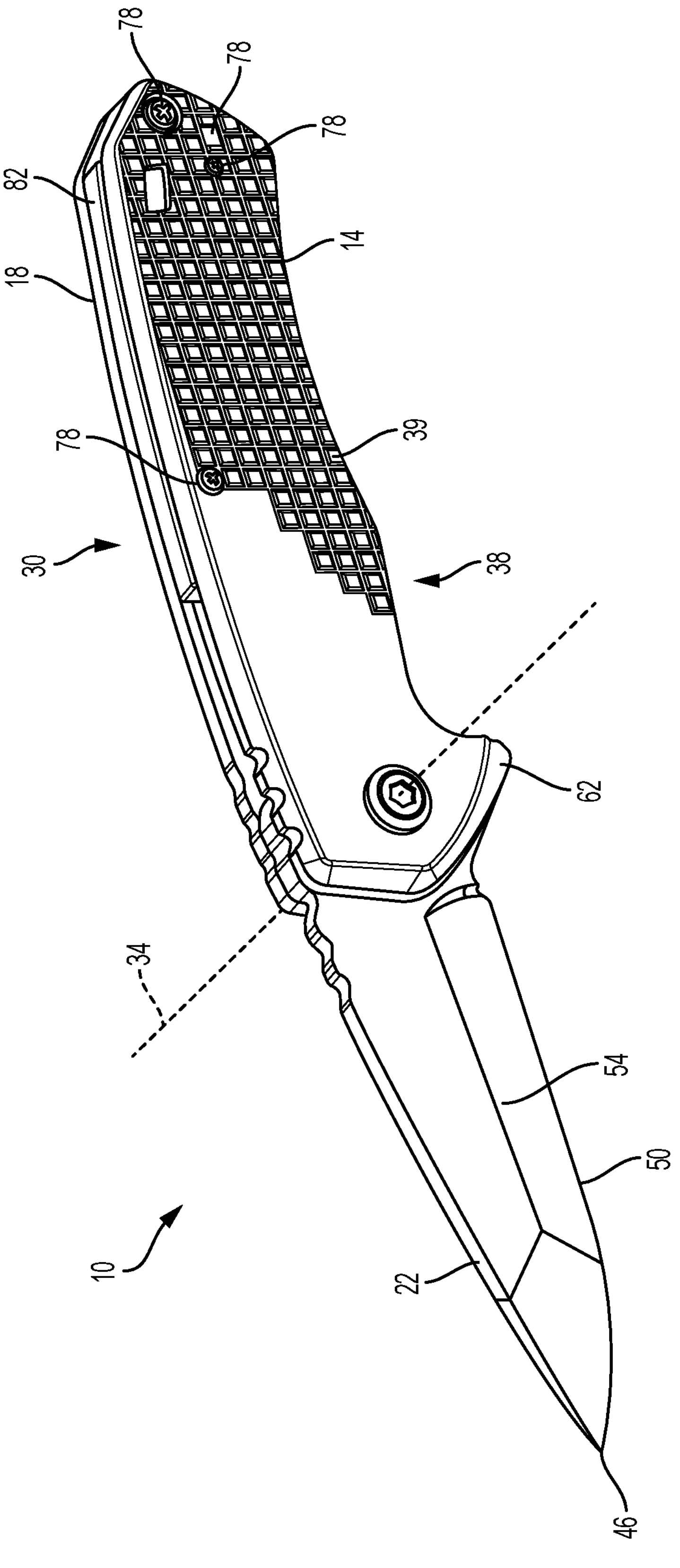
FIG. 1 is a perspective view of a knife according to an embodiment of the invention.
Figure 2:
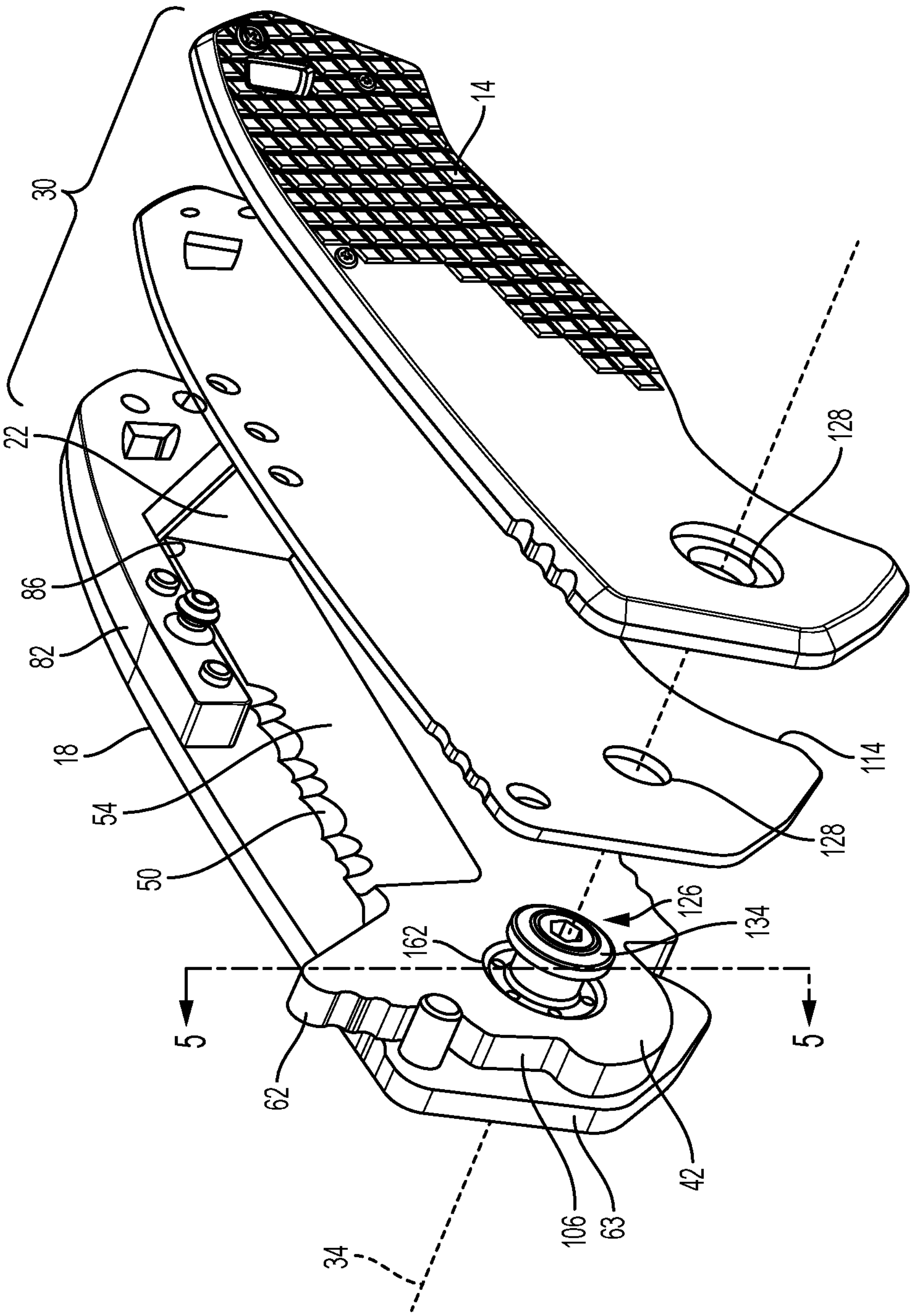
FIG. 2 is an exploded perspective view of a back side of the knife of FIG. 1.

FIGS. 1 and 2 illustrate a knife, and more specifically, a folding knife 10. The knife 10 includes a first handle portion 14, a second handle portion 18, and a blade 22 pivotally coupled to the handle portions 14, 18. The handle portions 14, 18 each generally define half of a handle 30 of the knife 10. The blade 22 is pivotally coupled to the handle 30 so that the blade 22 can pivot about a pivot axis 34 between an extended position (FIG. 1) and retracted or closed position (FIG. 2). In the retracted position, a portion of the blade 22 is received and stored within the handle 30 between the portions 14, 18. The handle 30 includes a blade cavity 38 adjacent a front side 39 of the handle 30 that receives at least a portion of blade 22 in the retracted position. The blade cavity 38 is disposed between the handle portions 14, 18.

With continued reference to FIGS. 1 and 2, the blade 22 includes a tang 42 proximate the pivot axis 34 and a distal end 46 located opposite the tang 42. The blade 22 further includes a cutting edge 50 formed by opposing faces 54, 58 of the blade 22 converging toward each other to a common apex. The cutting edge 50 of the blade 22 is configured to be used by an operator to perform a cutting operation. Although the cutting edge 50 of the illustrated embodiment is partially serrated, in other embodiments, the cutting edge 50 may be formed differently (i.e., a continuous edge).

The blade 22 further includes a protruding portion (i.e., an actuator 62) proximate the tang 42. The actuator 62 is formed as an integral member of the blade 22 and protrudes outwardly from the tang 42. Specifically, the actuator 62 extends beyond an outer periphery 63 of the handle 30 in the extended and retracted position of the blade 22. As a result, an operator has access to the actuator 62 when the blade 22 is in the retracted position. Although the actuator 62 of the illustrated embodiment is integrally formed with the blade 22, the actuator 62 may alternatively be a separate component from the blade 22 such that the blade 22 pivots in response to the actuator 62 acting on a portion of the blade 22, e.g. a kicker that is rotatable separate from the blade 22 and is configured to act on the blade 22 to open the blade 22.

Figure 3:
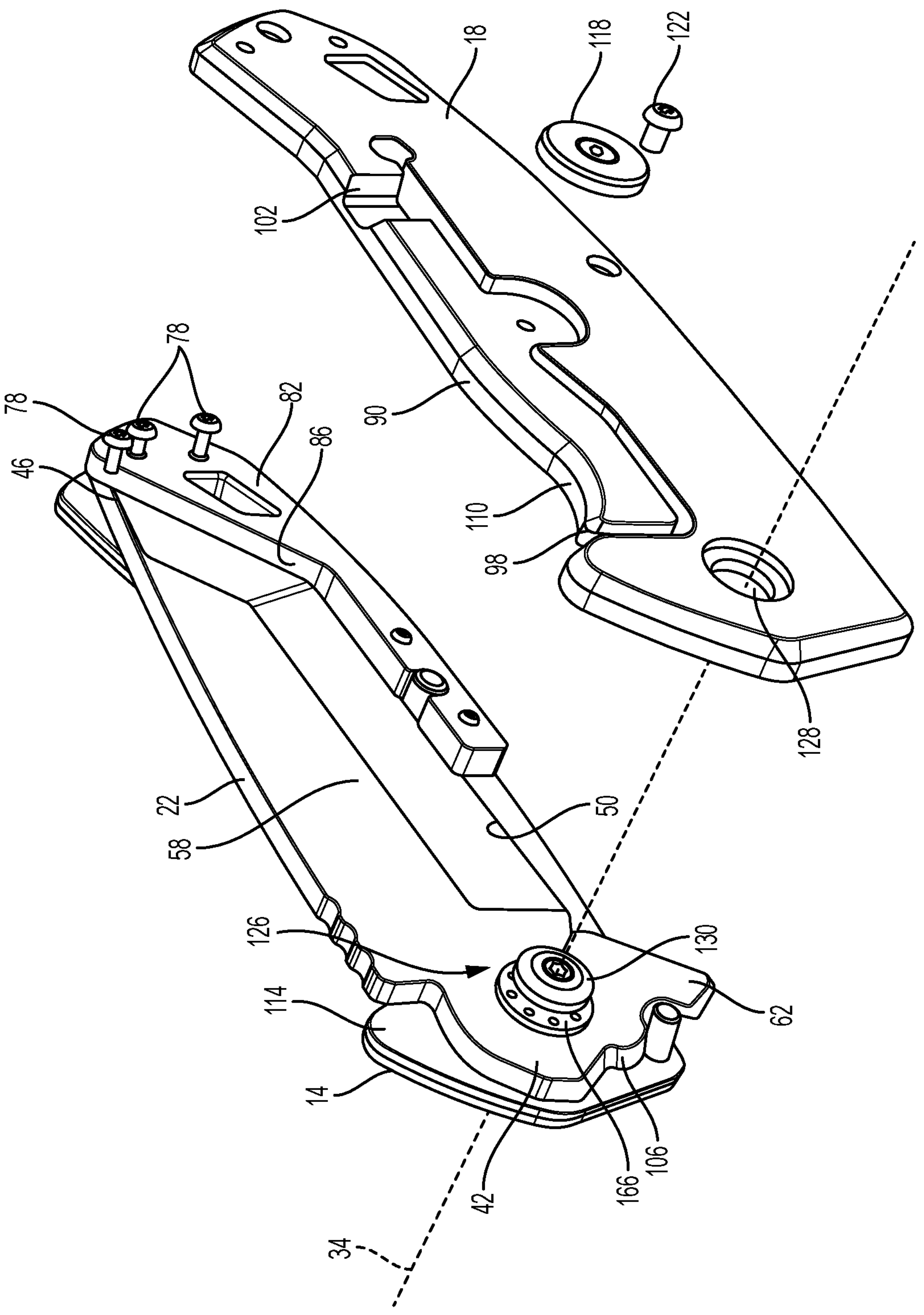
FIG. 3 is an exploded perspective view of a front side of the knife of FIG. 1, illustrating a portion of a bearing assembly disposed about a rotational axis of the knife.

With reference to FIGS. 1-3, the knife 10 of the illustrated embodiment further includes a spacer 82 interposed between the handle portion 18 and a liner 114. The liner 114 is, in turn, interposed between the handle 14 and the blade 22. A plurality of fasteners 78 connects the spacer 82, the liner 114, and the handle portions 14, 18. The spacer 82 is disposed proximate the rear end of the knife 10 and defines a width of the blade cavity 38. The spacer 82 includes a stop surface 86 that abuts the blade 22 in the retracted position of the blade 22 to inhibit further rotation of the blade 22 beyond the retracted position.

In the illustrated embodiment of FIG. 2, the knife 10 further includes a locking arm 90 formed as an integral component of the handle portion 18. The locking arm 90 maintains the blade 22 in the extended position. The locking arm 90 is cantilevered from a portion of the handle portion 18. The locking arm 90 also has a free end 98 extending away from a connecting end 102. The locking arm 90 is curved such that the free end 98 is biased toward the blade cavity 38. The locking arm 90 is movable between a locked configuration and an unlocked configuration. In the locked configuration, the locking arm 90 inhibits movement of the blade 22. In the unlocked configuration, movement of the blade 22 is allowed. The locking arm 90 is biased toward the locked configuration, in which the free end 98 of the locking arm 90 engages a shoulder 106 at the tang 42 of the blade 22 to resist movement of the blade 22 away from the extended position. The free end 98 of the locking arm 90 includes a tab 110 that is partially disposed outside of the handle 30 to enable an operator to easily access the tab 110. The tab 110 facilitates moving the locking arm 90. A retaining member (i.e., a washer 118 and a fastener 122) is secured to the handle portion 18 and selectively engages the locking arm 90. Specifically, the washer 118 engages the locking arm 90 when the locking arm 90 is actuated toward the unlocked configuration in order to inhibit the locking arm 90 from extending beyond the unlocked configuration. Also, the washer 118 avoids inadvertent or excessive bending of the locking arm 90, which could cause the knife 10 to malfunction.

Figure 4:
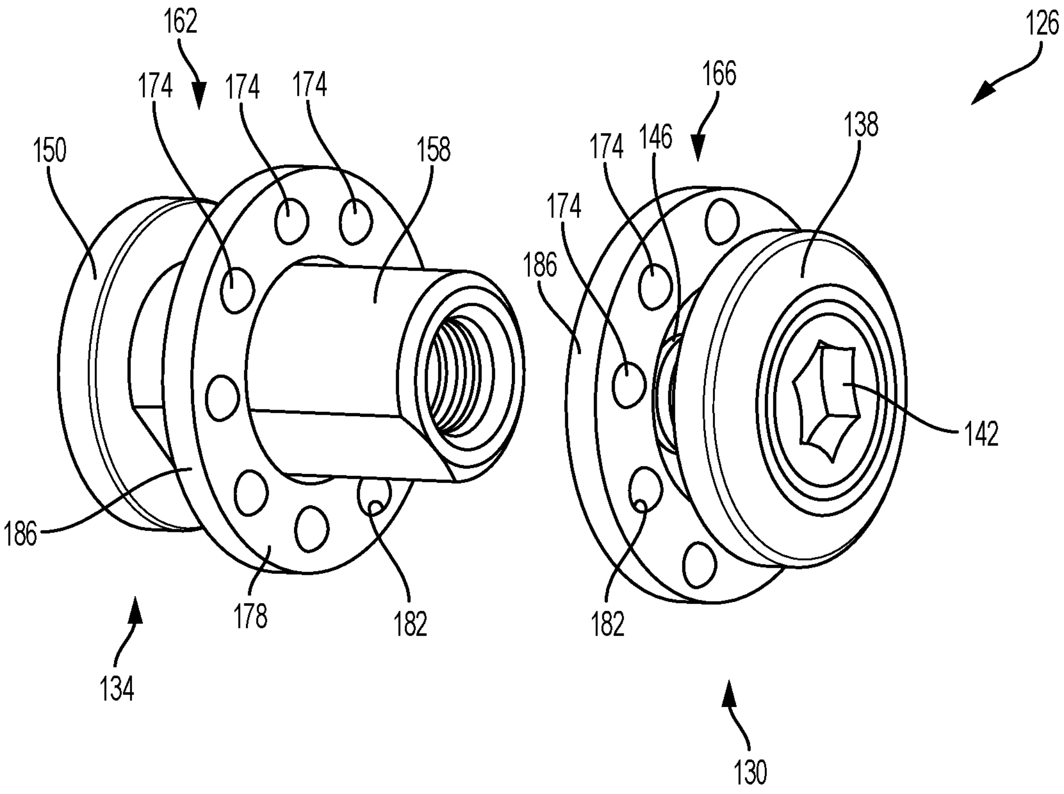
FIG. 4 is a perspective view of the bearing assembly.

With reference to FIGS. 2-4, the knife 10 further includes a bearing assembly 126 disposed about the pivot axis 34 to facilitate rotational movement of the blade 22 relative to the handle portions 14,18. Specifically, the handle portions 14, 18, the liner 114, and the blade 22 each include an aperture 128 co-axial with the pivot axis 34 for receiving at least a portion of the bearing assembly 126. The bearing assembly 126 includes a first or male fastener 130 (i.e., screw, bolt, etc.) and a second or female fastener 134 (i.e., screw, bolt, etc.) that couple together in order to pivotally couple the handle portions 14, 18 and the blade 22. The male fastener 130 includes a head 138, a tool receiving portion 142 on the head 138, and an externally threaded stem 146 protruding away from the head 138. Similarly, the female fastener 134 includes a head 150, a tool receiving portion 154 (FIG. 5) on the head 150, and an internally threaded stem 158 protruding away from the head 138. The internally threaded stem 158 has the inverse thread pattern to that of the externally threaded stem 146, such that the stem 146 is threadable and thereby receivable with stem 150. As shown in the illustrated construction of FIG. 4, the outer periphery of the stem 150 is cylindrical in shape, which engages the inner periphery of the apertures 128.

Figure 5:
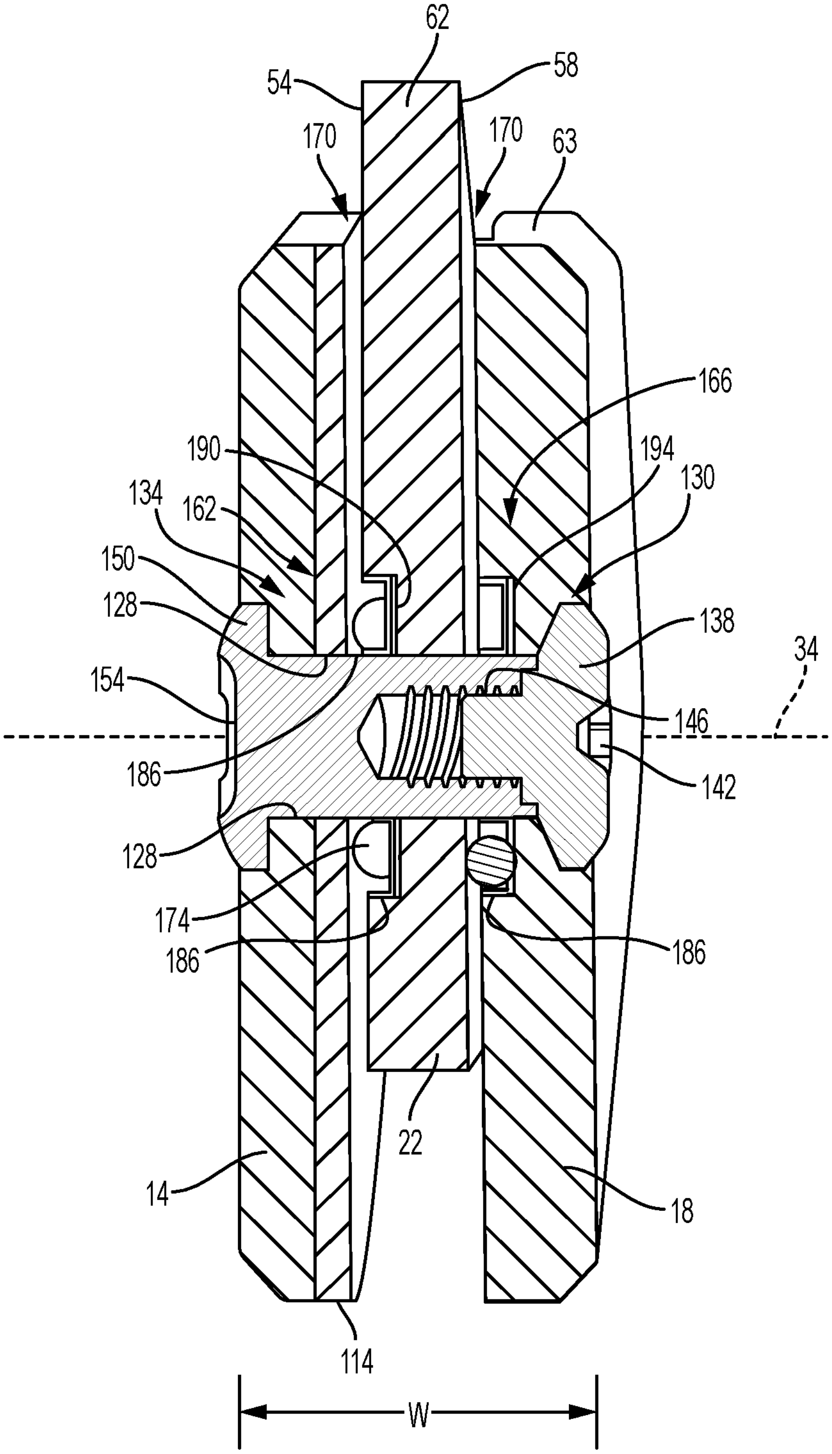
FIG. 5 is a cross-sectional view of the knife along line 5-5 of FIG. 2.

With reference to FIG. 5, when assembling the knife 10, the apertures 128 of the handle portions 14, 18, the liner 114, and the blade 22 are aligned in order to pass the female fastener 134 through the apertures 128 until the head 150 engages the handle portion 14. Subsequently, the male fastener 130 passes through the handle portion 18 to mate with the female fastener 134. At this point, at least one of the fasteners 130, 134 is rotated to cause the threaded portions 146, 158 to engage causing axial movement of the fasteners 130, 134 along the rotational axis 34 until each head 138, 150 engages the handle portions 18, 14, respectively, thereby capturing the handle portions 14, 18, the liner 114, and the blade 22 between the heads 138, 150. The heads 138, 150 are low-profile in order to minimize the amount at which the fasteners 130, 134 protrude beyond a width W of the knife 10.

With reference to FIGS. 2-4, the bearing assembly 126 further includes a set of thrust bearings 162, 166 disposed co-axially with the axis 34 and about the female fastener 134 to minimize friction during relative movement between the handle portions 14, 18 and the blade 22. Like conventional rotary rolling-element bearings, the thrust bearings 162, 166 permit rotation between parts (e.g., the blade 22 and the liner 114). However, the thrust bearings 162, 166 also provide support to a load in a predominately axial direction (e.g., pivot axis 34). The thrust bearings 162, 166 are disposed on opposing sides of the blade 22 creating a gap 170 (FIG. 5) on either side of the blade 22 to inhibit contact between the opposing face 54 of the blade 22 and the liner 114, and the other opposing face 58 and the handle portion 18. Each thrust bearing 162, 166 includes a plurality of engagement members (e.g., balls 174) and a disc-shaped cage 178 having a plurality of apertures 182. Each thrust bearing 162, 166 further includes inner and outer circumferential flanges 186 that extend away from the disc-shaped cage 178. The balls 174 are radially constrained by the inner and outer circumferential flange 186. Also, the balls 174 are axially constrained at least partially by the apertures 182 of the disc-shaped cage 178. The balls 174 are further constrained in the axial direction by the blade 22 and the liner 114. Specifically, the liner 114 and the blade 22 substantially act as a race for the thrust bearing 162 to further constrain the balls 174 in the axial direction of axis 34. Also, the blade 22 and the handle portion 18 substantially act a race of the thrust bearing 166 to further constrain the balls 174 in the axial direction of axis 34. Eliminating the race as being an integral member of the thrust bearings 162, 166 advantageously decreases the width W of the knife 10 for ease of storage in the user's pocket, tool belt, knife holster, or the like. Although the bearing 166 of the illustrated embodiment is disposed within the handle 18, in other embodiments, the bearing 166 may alternatively be disposed within the blade 22 such that both bearings 162, 166 are disposed within the blade 22.

With reference to FIG. 5, when the knife 10 is assembled, the thrust bearing 162 is recessed within an annular inwardly-extending groove 190 (i.e., a pocket) formed on the blade 22, whereas the thrust bearing 166 is recessed within an annular inwardly-extending groove 194 (i.e., a pocket) formed on the handle portion 18. As such, the disc-shaped cage 178 of each bearing 162, 166 is encased within each groove 190, 194, respectively. That is, the thrust bearing 162 is coupled to the blade 22 and the thrust bearing 166 is coupled to the handle portion 18. The balls 174 of the thrust bearing 162 extend beyond the opposing face 54 of the blade 22 to form the gap 170 between the blade 22 and the liner 114. Similarly, the balls 174 of the thrust bearing 166 extend beyond the handle portion 18 to form the gap 170 between the blade 22 and the handle portion 18.

In operation, to pivot the blade 22 from the retracted position to the extended position, an operator applies a force to the actuator 62. Once the blade 22 is in the extended position, the locking arm 90 engages the shoulder 106 of the blade 22. To pivot the blade 22 from the extended position to the retracted position, an operator applies a force to a portion of the blade 22, while simultaneously moving the locking arm 90 from the locked configuration to the unlocked configuration. While the blade 22 pivots between the retracted and extended positions, the plurality of balls 174 of the thrust bearing 162 engage with and roll against the groove 190 of the blade 22 and the liner 114. Also, the plurality of balls 174 of the thrust bearing 166 engage with and roll against the groove 194 of the handle portion 18 and the opposing face 58 of the blade.

Although the invention has been described in detail with reference to certain preferred embodiments, variations and modifications exist within the scope and spirit of one of more independent aspects of the invention as described.

What is claimed is:

1. A folding knife comprising:

a handle comprising a first handle and a second handle coupled to the first handle;

a blade having a cutting edge, the blade is pivotably coupled to the handle between the first handle and the second handle, the blade is pivotable about a pivot axis with respect to the first handle and the second handle between a retracted position and an extended position, the cutting edge is exposed in the extended position and a portion of the blade is received between the first handle and the second handle in the retracted position; and a groove within the blade, the groove extending around the pivot axis;

a bearing within the groove for facilitating movement of the blade between the retracted position and the extended position, the groove comprising a recessed surface facing towards the first handle, the bearing comprising a disc-shaped bearing cage, the disc-shaped bearing cage comprising a lateral surface that faces towards the first handle and away from the recessed surface; and a stem that extends longitudinally along the pivot axis, the stem comprising an outer planar portion facing away from the pivot axis, and the outer planar portion of the stem is received within an aperture of the second handle and an aperture of the disc-shaped bearing cage.

2. The folding knife of claim 1, the stem comprising a cylindrical outer surface facing away from the pivot axis.

3. The folding knife of claim 1, comprising a liner interposed between the first handle and the blade.

4. The folding knife of claim 3, comprising a spacer between the second handle and the liner.

5. The folding knife of claim 1, comprising a plurality of engagement members partially supported by the bearing cage.

6. The folding knife of claim 5, the plurality of engagement members extending beyond the blade to form a gap between the blade and the first handle.

7. The folding knife of claim 1, further comprising a locking arm that is moveable between a locked configuration and an unlocked configuration, the locking arm inhibits movement of the blade in the locked configuration, whereas movement of the blade is allowed in the unlocked configuration.

8. The folding knife of claim 7, comprising a retaining member, the retaining member is operable to engage the locking arm to inhibit the locking arm from extending beyond the unlocked configuration.

9. The folding knife of claim 1, wherein the stem comprises an internal threading.

10. The folding knife of claim 1, wherein the bearing cage does not extend out of the groove.

11. A folding knife comprising:

a handle comprising a first handle and a second handle coupled to the first handle;

a blade having a cutting edge, the blade is pivotably coupled to the handle between the first handle and the second handle, the blade is pivotable about a pivot axis with respect to the first handle and the second handle between a retracted position and an extended position, the cutting edge is exposed in the extended position and a portion of the blade is received within the handle in the retracted position;

a groove in the second handle, the groove extending around the pivot axis;

a bearing within the groove in the second handle, the bearing comprising a disc-shaped bearing cage and a plurality of engagement members partially supported by the disc-shaped bearing cage; and a stem that extends longitudinally along the pivot axis, the stem comprising an outer planar portion facing away from the pivot axis, and the outer planar portion of the stem is received within an aperture of the blade and an aperture of the disc-shaped bearing cage.

12. The folding knife of claim 11, comprising a plurality of engagement members partially supported by the bearing cage.

13. The folding knife of claim 12, the plurality of engagement members extending beyond the second handle to form a gap between the second handle and the blade.

14. The folding knife of claim 13, the stem comprising a cylindrical outer surface facing away from the pivot axis.

15. The folding knife of claim 13, wherein the bearing cage does not extend out of the groove.

16. The folding knife of claim 11, wherein the first handle and the second handle are detachably coupled.

17. A folding knife comprising:

a handle comprising a first handle and a second handle coupled to the first handle;

a blade having a cutting edge, the blade is pivotably coupled to the handle between the first handle and the second handle, the blade is pivotable about a pivot axis with respect to the first handle and the second handle between a retracted position and an extended position, the cutting edge is exposed in the extended position and a portion of the blade is received within the handle in the retracted position; and a first groove within the blade, the first groove extending around the pivot axis;

a first bearing within the first groove, the first bearing defining a first central aperture, the first bearing comprising a first plurality of engagement members arranged around the first central aperture, the first plurality of engagement members facilitating movement of the blade between the retracted position and the extended position;

a second groove within the second handle;

a second bearing within the second groove, the second bearing defining a second central aperture, the second bearing comprising a second plurality of engagement members arranged around the second central aperture, the second plurality of engagement members facilitating movement of the blade between the retracted position and the extended position; and a stem received within the first central aperture of the first bearing and the second central aperture of the second bearing, the stem comprising a planar outer surface that faces towards at least one of the first bearing and the second bearing.

18. The folding knife of claim 17, the stem comprising an internal threading and a cylindrical outer surface facing away from the pivot axis.

19. The folding knife of claim 17, wherein the first plurality of engagement members extend beyond the blade to form a gap between the blade and the first handle.

20. The folding knife of claim 19, wherein the second plurality of engagement members extend beyond the second handle to form a gap between the second handle and the blade.

* * * * *